(12) United States Patent
Nelson et al.

(10) Patent No.: US 10,051,606 B1
(45) Date of Patent: Aug. 14, 2018

(54) EFFICIENT SPECTRUM ALLOCATION SYSTEM AND METHOD

(71) Applicant: Rockwell Collins, Inc., Cedar Rapids, IA (US)

(72) Inventors: Randy W. Nelson, Anamosa, IA (US); Joseph A. Lahart, Cedar Rapids, IA (US); Bradley G. Butikofer, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/844,397

(22) Filed: Sep. 3, 2015

(51) Int. Cl.
*H04W 72/02* (2009.01)
*H04W 28/18* (2009.01)
*H04W 72/08* (2009.01)

(52) U.S. Cl.
CPC ........... *H04W 72/02* (2013.01); *H04W 28/18* (2013.01); *H04W 72/085* (2013.01)

(58) Field of Classification Search
CPC .................. H04W 72/00–72/14; H04W 28/18
USPC .............................................. 455/450–452.2
See application file for complete search history.

(56) References Cited

U.S. PATENT DOCUMENTS

| | | | |
|---|---|---|---|
| 4,725,956 A | 2/1988 | Hiroo Nagata | |
| 5,818,423 A | 10/1998 | Pugliese et al. | |
| 5,926,790 A | 7/1999 | Wright | |
| 5,974,384 A | 10/1999 | Yasuda | |
| 6,173,192 B1 | 1/2001 | Clark | |
| 6,389,355 B1 | 5/2002 | Gibbs et al. | |
| 7,024,309 B2 | 4/2006 | Doane | |
| 7,089,108 B2 | 8/2006 | Merritt | |
| 7,415,326 B2 | 8/2008 | Komer et al. | |
| 7,606,715 B1 | 10/2009 | Krenz | |
| 7,809,405 B1 | 10/2010 | Rand et al. | |
| 7,881,832 B2 | 2/2011 | Komer et al. | |
| 7,912,592 B2 | 3/2011 | Komer et al. | |
| 8,139,025 B1 | 3/2012 | Krenz | |
| 8,234,121 B1 | 7/2012 | Swearingen | |

(Continued)

OTHER PUBLICATIONS

Vanninen et al. "Cognitive HF—New Perspectives to Use the High Frequency Band", 2014 9th International Conference on Cognitive Radio Oriented Wireless Networks.*

(Continued)

*Primary Examiner* — Raymond Dean
(74) *Attorney, Agent, or Firm* — Angel N. Gerdzhikov; Donna P. Suchy; Daniel M. Barbieri

(57) ABSTRACT

A method includes monitoring, by a receiver of a first node, a portion of a spectrum. The method also includes receiving, by the receiver of the first node, a signal on a first frequency within a range of frequencies. The method additionally includes determining that the received signal is a link request from another node. The method further includes decoding a proposed link configuration from the link request. The proposed link configuration includes a proposed transaction frequency for a transaction to be sent to the first node from the other node. The proposed transaction frequency may be the same as or different from the first frequency. The method may also include determining, by a processor of the first node, whether the proposed link configuration is suitable. The method may additionally include receiving, by the receiver, at least one signal indicative of the transaction from the other node.

19 Claims, 10 Drawing Sheets

(56) References Cited

U.S. PATENT DOCUMENTS

| | | | |
|---|---|---|---|
| 8,311,827 | B2 | 11/2012 | Hernandez et al. |
| 8,380,366 | B1 | 2/2013 | Schulte et al. |
| 8,515,763 | B2 | 8/2013 | Dong et al. |
| 8,694,184 | B1 | 4/2014 | Boorman et al. |
| 8,761,971 | B2 | 6/2014 | Gershzohn |
| 2003/0110028 | A1 | 6/2003 | Bush |
| 2005/0055143 | A1 | 3/2005 | Doane |
| 2005/0203700 | A1 | 9/2005 | Merritt |
| 2006/0250973 | A1* | 11/2006 | Trott ............... H04W 28/18 370/252 |
| 2007/0206554 | A1* | 9/2007 | Laroia ............ H04L 5/0035 370/338 |
| 2007/0288242 | A1 | 12/2007 | Spengler et al. |
| 2008/0065275 | A1 | 3/2008 | Vizzini |
| 2009/0124208 | A1* | 5/2009 | Mody ............... H04L 63/162 455/67.11 |
| 2009/0196180 | A1* | 8/2009 | Bahl ............... H04L 5/0032 370/235 |
| 2010/0030400 | A1 | 2/2010 | Komer et al. |
| 2010/0034097 | A1* | 2/2010 | Nitta ............... H04L 12/24 370/241.1 |
| 2010/0292873 | A1 | 11/2010 | Duggan et al. |
| 2011/0086679 | A1* | 4/2011 | Li ............... H04W 52/242 455/572 |
| 2011/0118908 | A1 | 5/2011 | Boorman et al. |
| 2011/0176508 | A1* | 7/2011 | Altintas ............ H04W 72/085 370/329 |
| 2011/0255448 | A1* | 10/2011 | Hartman ............ H04L 27/0006 370/277 |
| 2012/0026190 | A1 | 2/2012 | He et al. |
| 2013/0005374 | A1* | 1/2013 | Uusitalo ............ H04W 28/26 455/509 |
| 2013/0064197 | A1* | 3/2013 | Novak ............... H04W 72/085 370/329 |
| 2013/0179009 | A1 | 7/2013 | Gershzohn |
| 2013/0345905 | A1 | 12/2013 | Parthasarathy |
| 2014/0032105 | A1 | 1/2014 | Kolbe et al. |
| 2014/0074323 | A1 | 3/2014 | Andre et al. |
| 2017/0041935 | A1* | 2/2017 | Shanmugam ......... H04W 88/08 |

OTHER PUBLICATIONS

U.S. Appl. No. 14/038,406, filed Sep. 26, 2013, Shapiro et al.
U.S. Appl. No. 14/038,439, filed Sep. 26, 2013, Shapiro et al.
U.S. Appl. No. 14/685,455, filed Apr. 13. 2013, Shapiro et al.
U.S. Appl. No. 13/248,814, filed Sep. 9, 2011, Barber.
U.S. Appl. No. 14/013,883, filed Aug. 29, 2013, Shapiro.
Withings, Pulse Ox, http://www2.withings.com/us/en/products/pulse, 7 pages, Printed online Jun. 9, 2015.
"Miniaturized Atomic Clock to Support Soldiers in Absence of GPS", http://www.defense-aerospace.com/cgi-bin/client/modele.pl?shop=dae&modele=release&prod=138990&cat=3; printed Jul. 7, 2015; U.K. Ministry of Defense; issued Oct. 3, 2012.
"Software-Defined Radio", https://en.wikipedia.org/wiki/software-defined_radio; printed Jul. 7, 2015.
"Chip-Scale Atomic Clock", https://en.wikipedia.org/wiki/chip-scale_atomic_clock; printed Jul. 7, 2015.
"MicroGRAM GPS Receiver", Product Brochure; http://www.rockwellcollins.com/~/media/Files/Unsecure/Products/Product%20Brochures/Navigation%20and%20Guidance/GPS%20Devices/MicroGRAM%20data%20sheet.aspx; printed Jul. 7, 2015; copyright 2013 Rockwell Collins.
Croft, John, et al., "Mode Masters", Aviation Week & Space Technology, Apr. 22, 2013, pp. 42-44.
Vakil, Sanjay S., et al., "Approaches to Mitigating Complexity-driven issues in commercial autoflight systems", Reliability Engineering and System Safety, 75 (2002), pp. 133-145, Elsevier Science Ltd., 2002.
Degani, Asaf, et al., "Modes in Automated Cockpits: Problems, Data Analysis, and a Modeling Framework", 36th Israel Annual Conference on Aerospace Sciences, Feb. 21-22, 1996, 16 pages.
Schutte, Paul C., et al., "The Naturalistic Flight Deck System: An Integrated System Concept for Improved Single-Pilot Operations", National Aeronautics and Space Administration, Hampton, VA, Dec. 2007, 63 pages.

* cited by examiner

EFFICIENT SPECTRUM ALLOCATION SYSTEM AND METHOD

CROSS-REFERENCE TO RELATED APPLICATIONS

The present application is related to U.S. patent application Ser. No. 14/720,198, filed on May 22, 2015, to U.S. patent application Ser. No. 14/817,808, filed on Aug. 4, 2015, to U.S. patent application Ser. No. 14/038,406, filed on Sep. 26, 2013, to U.S. patent application Ser. No. 14/038,439, filed on Sep. 26, 2013, to U.S. patent application Ser. No. 14/685,455, filed on Apr. 13, 2015, and to U.S. patent application Ser. No. 14/752,468, filed on Jun. 26, 2015, all of which are hereby expressly incorporated herein in their entirety.

BACKGROUND

The demand for usable bandwidth across all communications spectrums is increasing, and current spectrum usage protocols are inefficient. Current spectrum usage protocols utilize over-the-air data links established on predetermined frequencies for over-the-air communication between two nodes. Additionally, Anti-Access, Area Denial (A2AD) threats exacerbate spectrum availability issues for military purposes.

SUMMARY

In one aspect, embodiments of the inventive concepts disclosed herein are directed to a method and a node configured to perform the method. The method includes monitoring, by a receiver of a first node, at least a portion of a spectrum. The method also includes receiving, by the receiver of the first node, a signal on a first frequency within a range of frequencies. The method additionally includes determining that the received signal is a link request from another node. The method further includes decoding a proposed link configuration from the link request. The proposed link configuration includes a proposed transaction frequency for a transaction to be sent to the first node from the other node. The proposed transaction frequency may be the same as or different from the first frequency. The method also includes determining, by a processor of the first node, whether the proposed link configuration is suitable. The method additionally includes receiving, by the receiver of the first node, at least one signal indicative of the transaction from the other node.

In a further aspect, embodiments of the inventive concepts disclosed herein are directed to a method. The method includes monitoring, by a receiver of a first node, at least a portion of a spectrum. The method also includes determining, by a processor of the first node, a spectrum occupancy profile of the spectrum based on monitoring at least the portion of the spectrum. The spectrum occupancy profile includes information of unused frequencies of at least the portion of the spectrum. The method additionally includes selecting, by the processor of the first node, a proposed link configuration based on at least one of a signal-to-noise ratio, a delay spread, a signal strength, a type of service, a time of day, an approximate distance between the first node and another node, and the spectrum occupancy profile. The proposed link configuration includes a proposed transaction frequency for a transaction to be sent to the other node from the first node. The method further includes sending, by a transmitter of the first node over a frequency of a beacon frequency range, a link request including the proposed link configuration to the other node. The method also includes sending, by the transmitter of the first node, at least one signal indicative of the transaction to the other node.

Additional embodiments are described in the application including the claims. It is to be understood that both the foregoing general description and the following detailed description are exemplary and explanatory only and are not restrictive. Other embodiments will become apparent to persons of ordinary skill in the art having the benefit of the instant disclosure.

BRIEF DESCRIPTION OF THE DRAWINGS

Like reference numerals in the figures may represent and refer to the same or similar element, feature, step, or function. Implementations of the inventive concepts disclosed herein may be better understood when consideration is given to the following detailed description thereof. Such description makes reference to the annexed pictorial illustrations, schematics, graphs, drawings, and appendices, which are not necessarily to scale, and in which some features may be exaggerated and some features may be omitted or may be represented schematically or symbolically in the interest of clarity. In the drawings.

DETAILED DESCRIPTION

Figure 1:
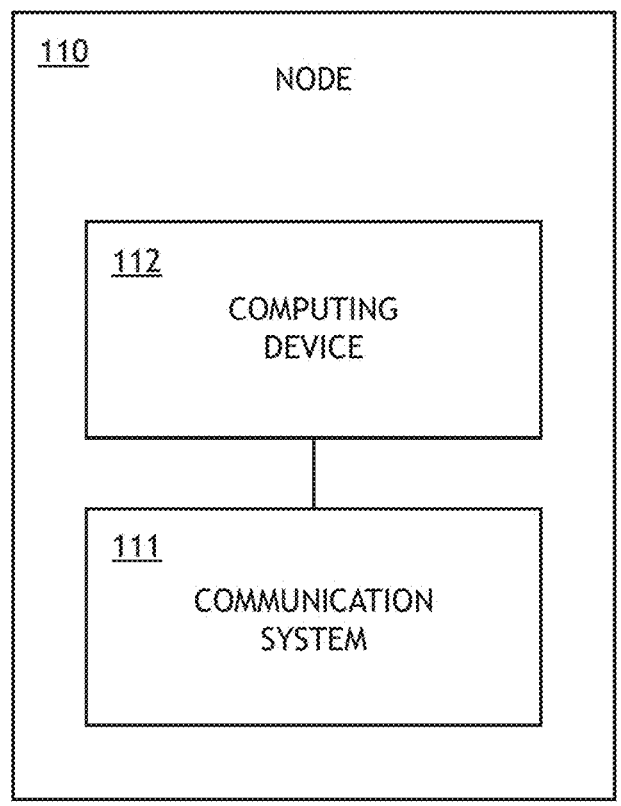
FIG. 1 shows a node of a network of one embodiment.

Reference will now be made in detail to exemplary embodiments of the inventive concepts disclosed herein, which are illustrated in the accompanying drawings. The scope of the inventive concepts disclosed herein is limited only by the claims; numerous alternatives, modifications, and equivalents are encompassed. For the purpose of clarity, technical material that is known in the technical fields related to the embodiments of the inventive concepts disclosed herein has not been described in detail to avoid unnecessarily obscuring the description.

Embodiments are configured to reduce transmissions within a communications spectrum and exploit unoccupied spectrum for data, analog, and digital voice communications. Embodiments include a system and method for identifying available bandwidth across any suitable over-the-air communications spectrum range and efficiently allocating a portion of available spectrum for communications links between nodes of a network. Within a particular spectrum range (e.g., a beacon frequency range), transmitters periodically send probe waveform transmissions (e.g., channel probes, which may also be referred to as channel quality probes) in a beacon frequency range. The channel probes may include information channel quality statistics or metrics of the transmitting node's ability to receive communications on a particular frequency(ies) or range(s) of frequencies by the transmitting node's receiver of a communication system. The transmitting node may maintain and update information of its receiver, where such information may include channel quality statistics, bandwidth availability, and other relevant metrics, and such information may be maintained in or added to one or more data structures (e.g., a database, a linked list, an associative array, a table, or a combination thereof) stored in a non-transitory computer readable medium (e.g., a memory medium, a cache medium, or a non-volatile storage medium). Data contained in such a data structure or data structures may be continuously or periodically updated.

Nodes may transmit the channel probes on beacon frequencies (e.g., frequencies in a beacon frequency range). Beacon frequencies may be any suitable frequencies within the beacon frequency range such that spectrum propagation characteristics are reasonably uniform across the spectrum sector of interest for the beacon frequency range. When a particular sender node has information to send to other node(s), the sender node transmits a link request on a beacon frequency to the receiving node(s). The link request may include proposed link information for a proposed link configuration (e.g., proposed by the sender node) such that the two nodes can negotiate a link configuration for a transaction (e.g., data, voice data, video data, text data, or analog voice). In response to the receiver node receiving the link request, the receiver node may (a) transmit a confirmation acknowledgement to the sender node that confirms the proposed link configuration or (b) transmit a counter-proposal link configuration to the sender node, for example, if there is interference or poor propagation characteristics associated with the sender's proposed link configuration. The proposed link configuration of the link request and the counter-proposal link configuration may include various information, such as a transaction frequency(ies) where the transaction will take place, the bandwidth, the services (e.g., audio data, video data, text data, analog voice, or other services) to be used, and/or the like. For example, the transaction frequency(ies) selected for the transaction may be based upon available bandwidth and propagation quality and may be offset (e.g., by several hundreds of kilohertz (kHz) or any other suitable offset) from the beacon frequency where the transaction was negotiated. Following such a handshake negotiation protocol, the sender node and the receiver node configure their transmitter and receiver, respectively, according to the agreed upon link configuration (e.g., which may include the transaction frequency(ies), bandwidth size, and service parameters), and the transaction between the two nodes begins.

Referring now to FIG. 1, a diagram of one node 110 of a plurality of nodes of a network (e.g., a mobile ad-hoc network (MANET) or a non-ad hoc network) of one embodiment is depicted. The node 110 includes a communication system 111 and at least one computing device 112, as well as other systems, equipment, and devices commonly included in a node of a network. Some or all of the communication system 111 (described in more detail with respect to FIG. 2), the computing device 112 (described in more detail with respect to FIG. 5), and other systems may be communicatively coupled. The other systems, devices, and equipment of the node 110 may include user input/output devices (e.g., a display, touchscreen display, keyboard, speakers, touchpad, buttons, and/or vibration units), a navigation system (e.g., a flight management system (FMS)), a wearable computing device, navigation sensors, onboard data recording system, and/or the like. The node 110 may accommodate or be user-interfaceable by one or more pilots, crew members, passengers, air traffic controllers, workers, or other users. The node 110 may be implemented as, on, or included in a vehicle (e.g., an aircraft, automobile, spacecraft, train, watercraft, or submersible craft), a mobile device (e.g., a mobile computing device, such as tablet computing device, laptop computing device, or mobile phone computing device), a mobile station (e.g., a mobile ground station, mobile air station, or mobile water station), or other mobile system. The node 110 may be implemented as, on, or included in a control station (e.g., a stationary control station, a mobile control station, a ground control station, a mobile ground control station, a maritime control station, a mobile maritime control station, an air control station, a space control station, or a satellite). A network including multiple nodes 110 may include nodes of different types (e.g., different vehicular type and/or different station type). Additionally, while the computing device 112 and the communication system 111 are depicted as separate devices, in some embodiments the computing device 112 and the communication system 111 may be implemented as a single integrated system or device or as any number of communicatively coupled systems or devices.

Figure 2:
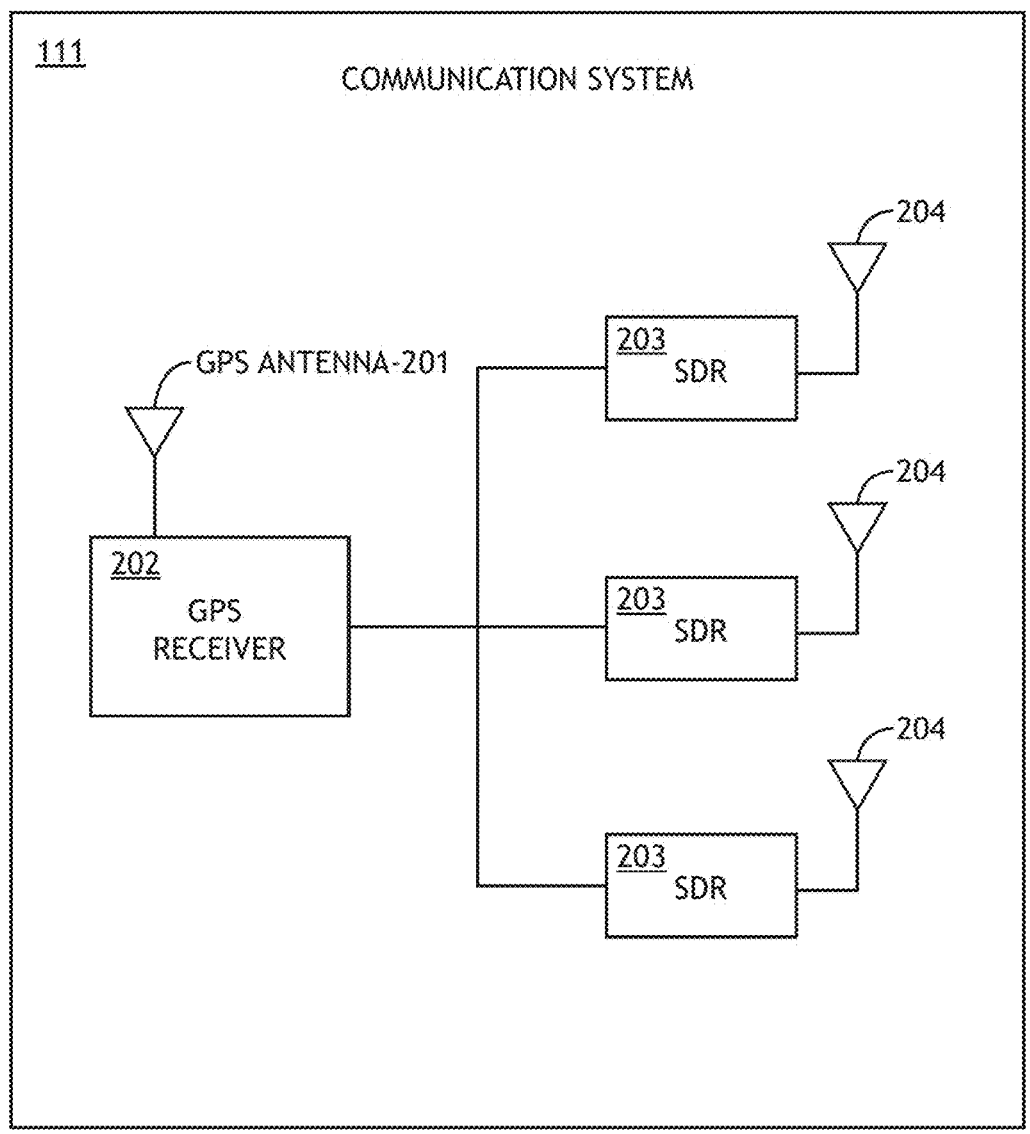
FIG. 2 depicts the communication system of the node of FIG. 1.

Referring now to FIG. 2, the communication system 111 of the node 110 of FIG. 1 is depicted. The communication system 111 is configured to send and/or receive signals, data, and/or voice transmissions to and/or from other nodes, control stations, satellites (e.g., communication satellites or global positioning system (GPS) satellites), or combinations thereof. As shown in FIG. 2, the communication system 111 may include a GPS antenna 201, a GPS receiver 202, one or more (e.g., three, as shown) software defined radios (SDRs) 203, and one or more corresponding SDR antennas 204. Some or all of the GPS antenna 201, the GPS receiver 202, the one or more SDRs 203, and the one or more corresponding SDR antennas 204 may be communicatively coupled. While the communication system 111 is depicted as having three SDRs 203, the communication system 111 may include any suitable radio types (such as non-SDR radios, hardware based radios, or the like), a combination of SDRs and non-SDR radios, or the like, and any suitable number of radios. For example, one or more radios of the communication system may be implemented as radio 400 as depicted in and described in more detail with respect to FIG. 4.

The GPS receiver 202 is configured to receive GPS signals via the GPS antenna 201 from GPS satellites. The GPS receiver 202 is configured to provide accurate node position and time to the SDRs 203 and the computing device 112 so long as GPS is available. For example, the GPS receiver 202 may receive or calculate location data from a sufficient number (e.g., at least four) of GPS satellites in view of the node 110 such that a GPS solution may be calculated. The GPS receiver 202 may be configured to provide the location data to any of various equipment/ systems of the node 110 or route the location data for transmission to an off-board source (e.g., another node). Additionally, the GPS receiver 202 may include an integrated atomic clock (e.g., chip scale atomic clock (CSAC), a rubidium atomic clock, or a cesium atomic clock) to maintain sufficiently accurate time for extended periods of time when GPS is not available.

Additionally, the communication system 111 may include at least one processor configured to run various software applications or computer code stored in a non-transitory computer-readable medium and configured to execute various instructions or operations.

Figure 3:
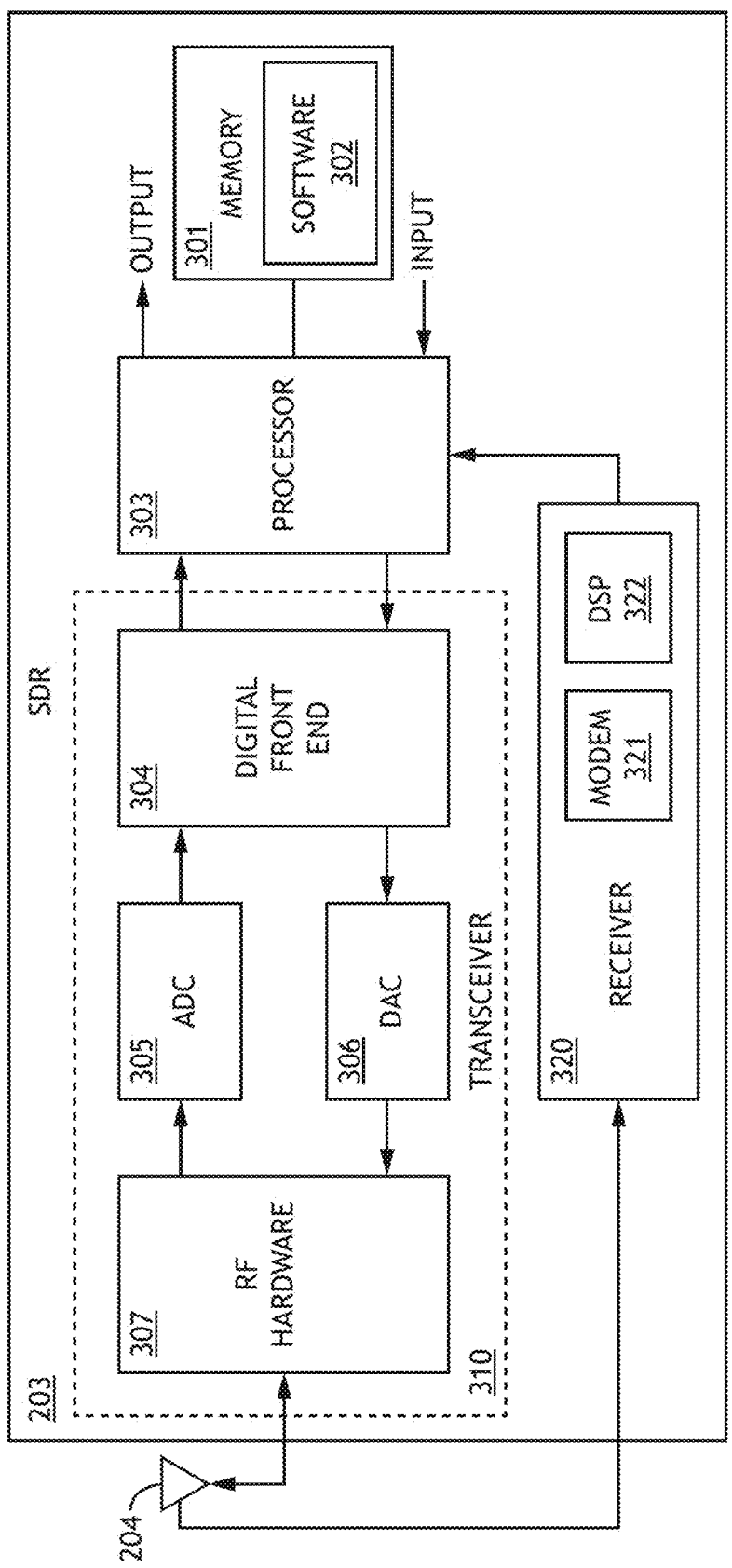
FIG. 3 depicts a software defined radio (SDR) coupled to an antenna of the communication system of FIG. 2.

Referring now to FIG. 3, an exemplary SDR 203 coupled to an exemplary SDR antenna 204 of FIG. 2 configured to send and receive signals or messages is shown. As shown in FIG. 3, the SDR 203 includes at least one transceiver 310, at least one receiver 320, at least one processor 303, and software 302 stored in a non-transitory computer readable medium (e.g., memory 301), some or all of which may be communicatively coupled. The processor 303 may be configured to perform any of various operations for performing any of various functions of the SDR 203 of the node 110. Additionally, the processor 303 may be configured to run various software applications or computer code stored in a non-transitory computer-readable medium of the node 110 and configured to execute various instructions or operations as disclosed throughout and configured to perform any suitable functions.

The transceiver 310 is configured to perform the functionality of a receiver and transmitter. The transceiver 310 may also be referred to as a transceiver chain of the SDR 203. In some embodiments, the transceiver 310 may be considered as including a first receiver (e.g., a main receiver). In some embodiments, the SDR 203 may include multiple transceivers 310 or transceiver chains. The transceiver 310 may include radio frequency (RF) hardware 307, an analog-to-digital converter (ADC) 305, a digital-to-analog converter 306, and a digital front end 304, as well as other components commonly found in a transceiver. For example, the RF hardware 307 may include a power amplifier and a filter, and the digital front end 304 may be configured for channelization and sample rate conversion. In some embodiments, the transceiver 310 may include a processor (e.g., a digital signal processor (DSP)) and memory. The processor 303 may be configured to receive inputs such as timing signals from the GPS receiver 202 and messages from computing device 112, and the processor 303 may perform operations on the received inputs by executing software 301 stored in memory 301 to provide digital signals to the digital front end 304, which in turn provides signals to the DAC 306 and the RF hardware 307, in effect emitting messages from the SDR antenna 204 to other nodes. Likewise, the processor 303 is configured to receive signals from the transceiver 310, and the processor 303 is configured to output messages, based on received signals, to a system or device of the node 110, such as the computing device 112. In one embodiment, the transceiver 310 may be implemented as a main half-duplex multi-band transceiver.

Additionally, the SDR 203 may include at least one receiver 320. The receiver 320 may also be referred to as a receiver chain of the SDR 203. In some embodiments, the receiver 320 may be considered as a second receiver (e.g., an auxiliary receiver or a spectral harvesting receiver). The receiver 320 may include a modulator-demodulator (modem) 321 and a processor (e.g., a digital signal processor (DSP) 322), as well as other components commonly found in a receiver, some or all of which may be communicatively coupled. The modem 321 may be configured to modulate and/or demodulate signals. The DSP 322 may be configured to process signals and output a digital signal to processor 303 (or another processor or device). While the receiver 320 is depicted as including a modem 321 configured to modulate and/or demodulate, a demodulator may be included in addition to the modem 321 or substituted for the modem 321 configured only to demodulate. Additionally, while the modem 321 and the DSP 322 are depicted as separate devices, in some embodiments the modem 321 and the DSP 322 may be implemented as a single integrated system or device (such a system on a chip (SOC)) or as any number of communicatively coupled systems or devices. In some embodiments, the SDR 203 may include multiple receivers 320 or receiver chains.

The processor 303 is configured to receive signals from the receiver 320, and the processor 303 is configured to output messages, based on received signals, to a system or device of the node, such as the computing device 112 or the transceiver 310 (e.g., for transmission of one or more signals to another node). In one embodiment, the receiver 320 may be implemented as a receive-only multi-band receiver.

Each of the at least one transceiver 310 and the at least one receiver 320 may be communicatively coupled to a same processor (e.g., 303, as shown) or separate processors (not shown), which may also be communicatively coupled.

While FIG. 3 depicts an exemplary SDR 203 having a particular configuration of particular components, it will be appreciated that suitable SDRs may include any suitable components, any suitable number of components, and any suitable arrangement of components. For example, an SDR 203 may be implemented as a multi-band SDR having multiple receive chains, such as an ARC-210 SDR or a Common Core SDR. For example, the ARC 210 has a main half-duplex multi-band transceiver and a receive-only multi-band receiver.

Figure 4:
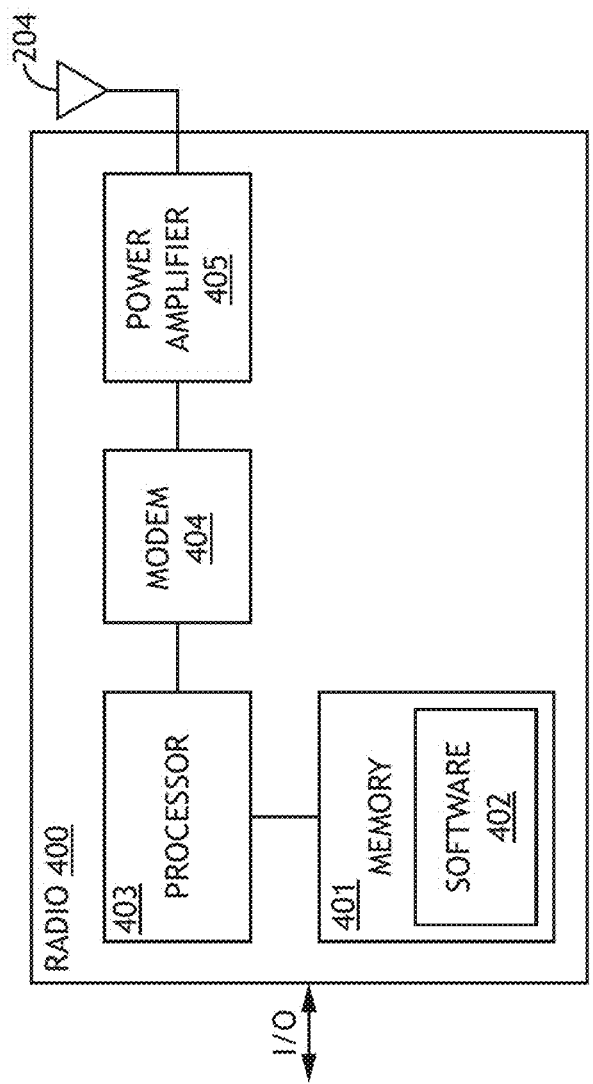
FIG. 4 depicts a radio of the node of FIG. 1.

Referring now to FIG. 4, an example of a radio 400 suitable for use in the communication system 111 of the node 110 of FIG. 1 is shown. The radio 400 may include a non-transitory computer readable medium (e.g., memory 401) configured to store software 402, a processor 403, a modem 404, and a power amplifier 405, as well as other components commonly found in a radio, some or all of which may be communicatively coupled. The radio 400 may include operability and/or functionality as at least one receiver (e.g., as depicted in and described with respect to FIG. 3), at least one transmitter (e.g., as described with respect to FIG. 3), at least one transceiver (e.g., as depicted in and described with respect to FIG. 3), or some combination thereof.

Figure 5:
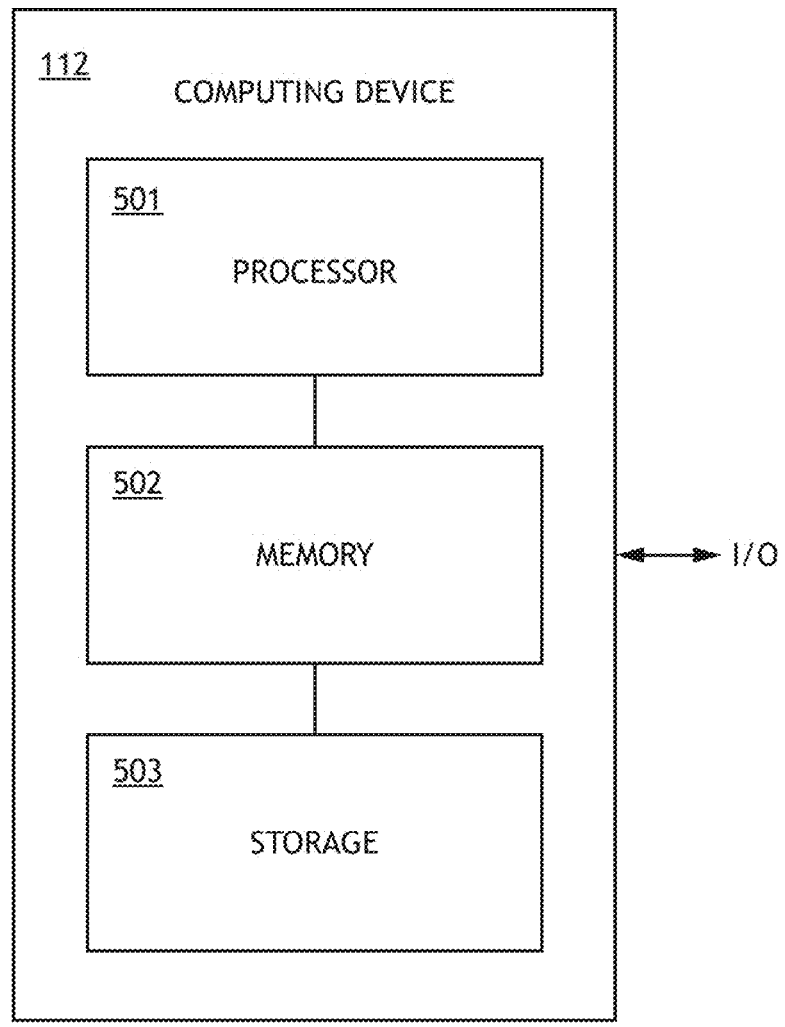
FIG. 5 depicts the computing device of the node of FIG. 1.

Referring now to FIG. 5, the computing device 112 of the node 110 of FIG. 1 is shown. The computing device 112 includes at least one processor 501, memory 502, storage 503, as well as other components, equipment, and/or devices commonly included in a computing device of a node 110. The processor 501, the memory 502, and the storage 503, as well as any other components may be communicatively coupled. The processor 501 may be configured to perform any of various operations for performing any of various functions of systems of the node 110. That is, the processor 501 may be configured to run various software applications or computer code stored in a non-transitory computer-readable medium (e.g., memory 502 and/or storage 503) and configured to execute various instructions or operations as disclosed throughout and configured to perform any suitable functions. A user may be configured to interface with the computing device 112 via any suitable input/output devices coupled to the computing device 112, such as a display (e.g., a touchscreen display), a keyboard, a trackpad, a mouse, a speaker, a vibration unit, a camera, a microphone, or the like. For example, where a node 110 is implemented as an aircraft, one or any number of computing devices 112 may be configured for performing functions associated with operating the aircraft. While the node 110 is depicted as having one computing device 112, a node 110 may include any number of computing devices 112.

Figure 6:
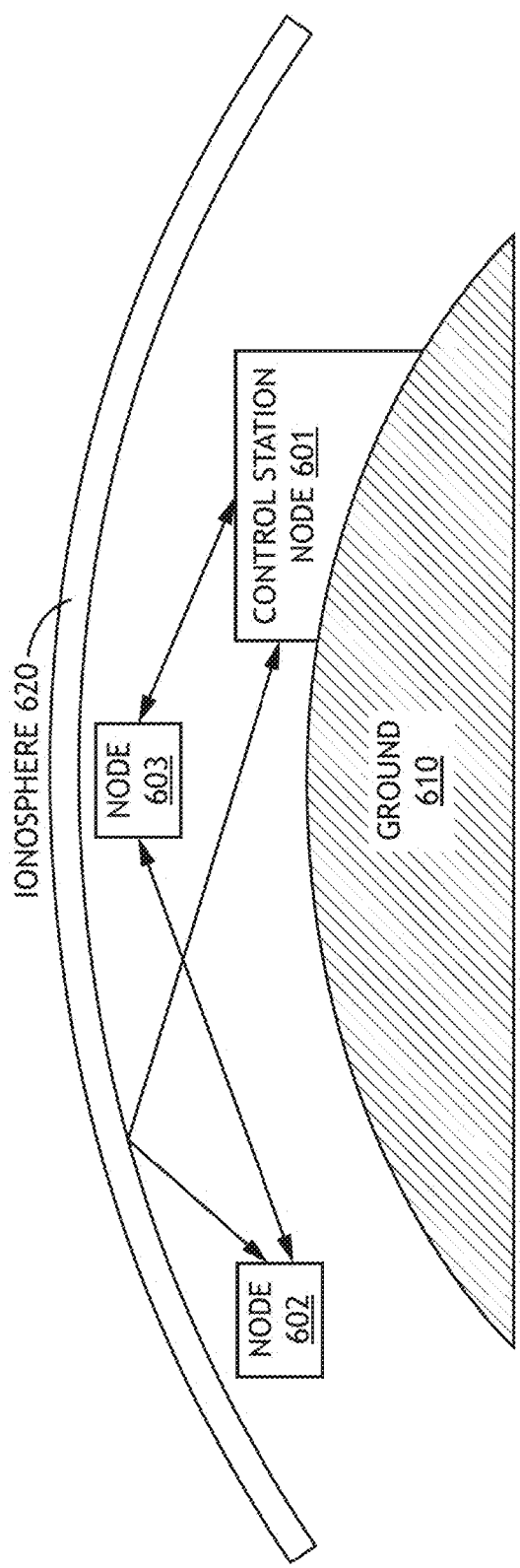
FIG. 6 depicts a diagram of an exemplary network of one embodiment.

Referring now to FIG. 6, an exemplary network of nodes is depicted. The network may include a control station node 601, node 602, and node 603, as well as any number or types of other nodes (not depicted). For example, the other nodes may include any number of vehicular nodes (e.g., aircraft nodes, watercraft nodes, and/or automobile nodes) and/or any number of control station nodes (e.g., ground control station nodes and/or maritime control station nodes). Each of nodes 601, 602, 603 may be configured as and/or include components as depicted in and described with respect to node 110 of FIGS. 1-5. As shown in FIG. 6, control station node 601 may be positioned on, at, or near the surface (e.g., the ground 610) of the earth. For example, the node 601 may be implemented as a stationary ground control station, a mobile ground control station, a maritime control station, or the like. Node 602 and node 603 are depicted as vehicular nodes (e.g., aircraft in flight). Some or all of the nodes 601, 602, and 603 are configured to communicate via signals or data links (periodically established or maintained data links) between the nodes 601, 602, and 603. For example, node 602 and control station node 601 are configured to send signals to one another or establish a data link between one another, such as by transmitting signals that are reflected and/or refracted off of the ionosphere 620 and received by the other node. Transmitting and receiving signals that are reflected and/or refracted off of the ionosphere 620 allows for beyond-line-of-sight (BLOS) communications between nodes that do not have a line-of-sight signal transmission path. For example, BLOS communications may include HF communications. The HF spectrum is unique because of the ability to refract signals off of the earth's ionosphere 620. The ionosphere 620 is constantly changing with respect to attenuating signal strength, and multiple copies of a signal may be refracted off of the ionosphere 620 resulting in multipathing at the receiver node (e.g., 602). For example, multiple "signal echoes" can be delayed up to 10 milliseconds (ms) from one another.

Embodiments do not require utilizing predetermined frequency communications. Embodiments may include monitoring (e.g., continuously monitoring, continuously monitoring for a particular duration of time, or sampling), such as by a receiver (e.g., 320), spectrum sectors of interest to identify sub-sectors of the spectrum sector(s) with reduced (e.g., minimal), if any, usage over time. A node's (e.g., 110, 601, 602, or 603) receiver (e.g., 320) may utilize a spectrum sensing or harvesting protocol to sense, harvest, and/or identify energy (e.g., from received signals) within the spectrum or spectrum sector of interest, signal bandwidth, signal strength, a signal duration (in time), a noise floor if in no signals are measured for a portion of a spectrum, and a frequency range of the spectrum of the signals. The receiver (e.g., 320) may monitor some (e.g., a portion of the spectrum, a particular spectrum sector, or a particular spectrum sub-sector; such as beacon frequency range) or all of a spectrum. For example, the receiver 320 and/or at least one processor (e.g., 303, 322, 403, or 501) of the node 602 may identify received signals (e.g., capture probes) within the beacon frequency range for signal signatures indicative of possible channel probe transmissions from other node(s) (e.g., control station node 601 or node 603) and may determine whether a received signal (e.g., capture probe) having a signature indicative of a channel probe transmission is a channel probe or a false signal. Upon determination of whether a received signal (e.g., capture probe) is a channel probe or a false signal, the receiver 320 and/or at least one processor (e.g., 303, 322, 403, or 501) of the node 602 may update a data structure (e.g., a spectrum database stored in a computer readable medium (e.g., storage 503 or memory 301, 401, and/or 502)) to include information of the channel probe or the false signal. The at least one processor (e.g., 303, 322, 403, or 501) of the node 602 may access the data structure and analyze spectrum occupancy profiles of the data structure related to a spectrum or spectrum portion of interest.

A beacon frequency may be a fixed or variable frequency. For example, a beacon frequency may be a random frequency within a pre-defined range (e.g., a beacon frequency range) of a spectrum sector. Each channel probe or link request is transmitted in a particular beacon frequency of a beacon frequency range. Beacon frequencies may be anywhere within a beacon frequency range of a spectrum sector. For example, the HF domain (2 megahertz (MHz) to 30 MHz) may include a plurality of spectrum sectors, such as dozens or more of spectrum sectors. A first spectrum sector, Alpha, may be defined as a 400 kHz sector ranging from 8.8 MHz to 9.2 MHz. For a first time period (e.g., one day, or any other suitable duration), a mission planner node may select 9.05 MHz to 9.1 MHz, a 50 kHz a sub-range of the Alpha sector, to be the beacon frequency range of the Alpha sector where channel probes or link request transmissions are to be initiated. A second sector, Bravo, may be a 300 kHz sector between 12.1 MHz and 12.4 MHz. The mission planner node may select 12.2 MHz to 12.25 MHz to be the beacon frequency range of the Bravo sector where channel probes or link request transmissions are to be initiated. All nodes within the network may use those beacon frequency ranges for channel probe transmissions and link requests. Any node in a network may initiate channel probes; however, in a typical network, very few of the network nodes might initiate channel probes. Typically, control stations transmit channel quality probes, but any node is allowed to transmit the channel probes.

The beacon frequency range may be dynamic and can be assigned in any spectrum sector as any range within a spectrum sector. For example, the beacon frequency ranges can be 20 kHz or 60 kHz. In addition, for very large HF spectrum sectors (such as above 200 kHz), there can be multiple beacon frequency ranges within a particular sector.

While the receiver 320 and/or at least one processor (e.g., 303, 322, 403, or 501) may be configured to perform a spectrum harvesting function that continuously monitors and analyzes any portion or the entirety of all spectrum sectors, the receiver 320 and/or at least one processor (e.g., 303, 322, 403, or 501) may closely monitor beacon frequency range(s) within each sector to identify signals matching a unique signature of a channel probe transmission or a link request transmission. Channel probe signatures and link request signatures may have similar radio frequency characteristics. Demodulation (e.g., by modem 321) of a signal (e.g., a channel probe or a link request) may determine the content of the signal.

The receiver 320 and/or at least one processor (e.g., 303, 322, 403, or 501) of the node 602 may monitor received signals (e.g., capture probes) for and/or identify received signals having particular signal energy signatures having or associated with particular covering sequences, modulations, or variable bandwidths located in spectrum areas of interest (e.g., in the beacon frequency range). The receiver 320 and/or at least one processor (e.g., 303, 322, 403, or 501) may identify a received signal as a capture probe if the received signal has a particular (e.g., predetermined or dynamically determined by a mission planning node(s)) signal bandwidth and/or modulation type.

Capture probes may have variable bandwidth sizes, which may be different for each spectrum. For example, for the High Frequency (HF) spectrum, transmission bandwidths are typically 1.8, 2.4 or 3.0 kHz signals; however, capture probes may have bandwidths that are different from (e.g., narrower, wider, or in between) typical HF bandwidths. When the receiver 320 and/or at least one processor (e.g., 303, 322, 403, or 501) identifies a signal that matches capture probe signature characteristics within a spectrum sector of interest, a demodulator component (e.g., of the modem 321) and/or at least one processor (e.g., 303, 322, 403, or 501) determines if the signal (e.g., a capture probe) is a channel probe or a link request (e.g., a call to set up a link for data exchanges). If a capture probe does not match the capture probe signature characteristics, a demodulator component (e.g., of the modem 321) and/or at least one processor (e.g., 303, 322, 403, or 501) may determine the signal (e.g., a capture probe) to be a false signal, and the signal's bandwidth, frequency, and modulation may be recorded in a false signal data structure (e.g., a database) stored in a non-transitory computer readable medium. Further, for example, a false signal may be a signal having a bandwidth or modulation type that matches the signal signature characteristics defined by a mission plan, but demodulating or decoding what would typically be a preamble does not result in an expected preamble.

At least one processor (e.g., 303, 322, 403, or 501) may identify future received signals as false signals by accessing the false signal data structure and by comparing a future received signal's characteristics against characteristics of previously received false signals maintained in the false signal data structure.

If the received signal is determined to be a channel probe, receiver 320 and/or at least one processor (e.g., 303, 322, 403, or 501) of the node 602 captures and stores information about and/or information contained in the channel probe. Such channel probe information may include information of a signal-to-noise ratio (SNR), multipath delay spread measurements, radio frequency (RF) signal strength, bit error rate, other channel quality statistics of interest, spectrum location, transmit power, time of day, and/or the like. When a sending node (e.g., control station node 601) transmits a channel probe, the channel probe may include or be encoded with symbols decodable by the receiver node (e.g., 602) such that the receiver 320 and/or at least one processor (e.g., 303, 322, 403, or 501) of the node 602 may derive (e.g., decode) channel probe information from the channel probe. The channel probe may also include information of the sender node's (e.g., 601) location (e.g., GPS location, latitude, and/or longitude) and/or a call sign (e.g., address) such that the receiver 320 and/or at least one processor (e.g., 303, 322, 403, or 501) of the receiver node (e.g., 602) may decode a location of the sender node (e.g., 601). Determining a sender node's (e.g., 601) location enables other network nodes (e.g., 602, 603) to determine reliable estimates of the HF spectrum sectors that would provide suitable, as well as optimal, propagation characteristics for communications by utilizing propagation prediction protocols.

Receiving nodes (e.g., 602, 603) do not need to respond in kind by transmitting a channel probe back to the sender node (e.g., 601) that initiated the channel probe transmission. That is, embodiments do not require back and forth capture probe exchanges, such as those used in HF Automatic Links Establishment (ALE) sound exchanges to reduce spectrum congestion.

If the received signal is demodulated and determined to be a link request (e.g., a request to initiate a transaction), the receiver node(s) (e.g., 602, 603) may decode the sender node's (e.g., 601) proposed transaction information, such as transaction frequency (e.g., a dial frequency), bandwidth, service, identification, and/or other proposed transaction information. The receiver node (e.g., 602) may send an acknowledgement to the sender node (e.g., 601) that confirms the sender node's proposed link configuration, or the receiver node (e.g., 602) may respond to the sender node (e.g., 601) with a counter-proposal link request that proposes a different link configuration for the transaction, for example, if the sender node's (e.g., 601) proposed frequency and bandwidth for the transaction is not possible at the receiver node's (e.g., 602) location because of local interference near the receiver node (e.g., 602) or poor propagation characteristics. If the sender node's (e.g., 601) initial link request is countered by the receiver node (e.g., 602), the sender node (e.g., 601) may respond to the receiver node (e.g., 602) with an acknowledgement that confirms the receiver node's (e.g., 602) counter-proposed link configuration. When the negotiation process is completed, the transaction is initiated between the sender node (e.g., 601) and the receiver node (e.g., 602). Upon completion of the transaction by the receiver node, the link may be terminated, and all participating nodes may return to a spectrum sensing and/or signal harvesting mode.

If the sender node's (e.g., 601) link request for a transaction is not responded to (e.g., by an acknowledgment or a counter-proposal link request) by the intended receiver node (e.g., 602) within a predetermined time, the sender node (e.g., 601) may assume the receiver node (e.g., 602) could not demodulate the link request or did not receive the link request. For example, inability to demodulate a link request may occur in the HF spectrum when employing skywave communications where the signal is refracted from the ionosphere. If operating in the HF spectrum domain, the inability to demodulate a signal may be due to a very low SNR environment or due to the frequency not being suitable to support communications between the geographical locations of the nodes. When operating in the HF domain in particular, if the sender node (e.g., 601) does not receive a response, the sender node (e.g., 601) may send another link request to the receiver node (e.g., 602) in another HF spectrum sector determined to have acceptable propagation strength and adequate available bandwidth.

Figure 7:
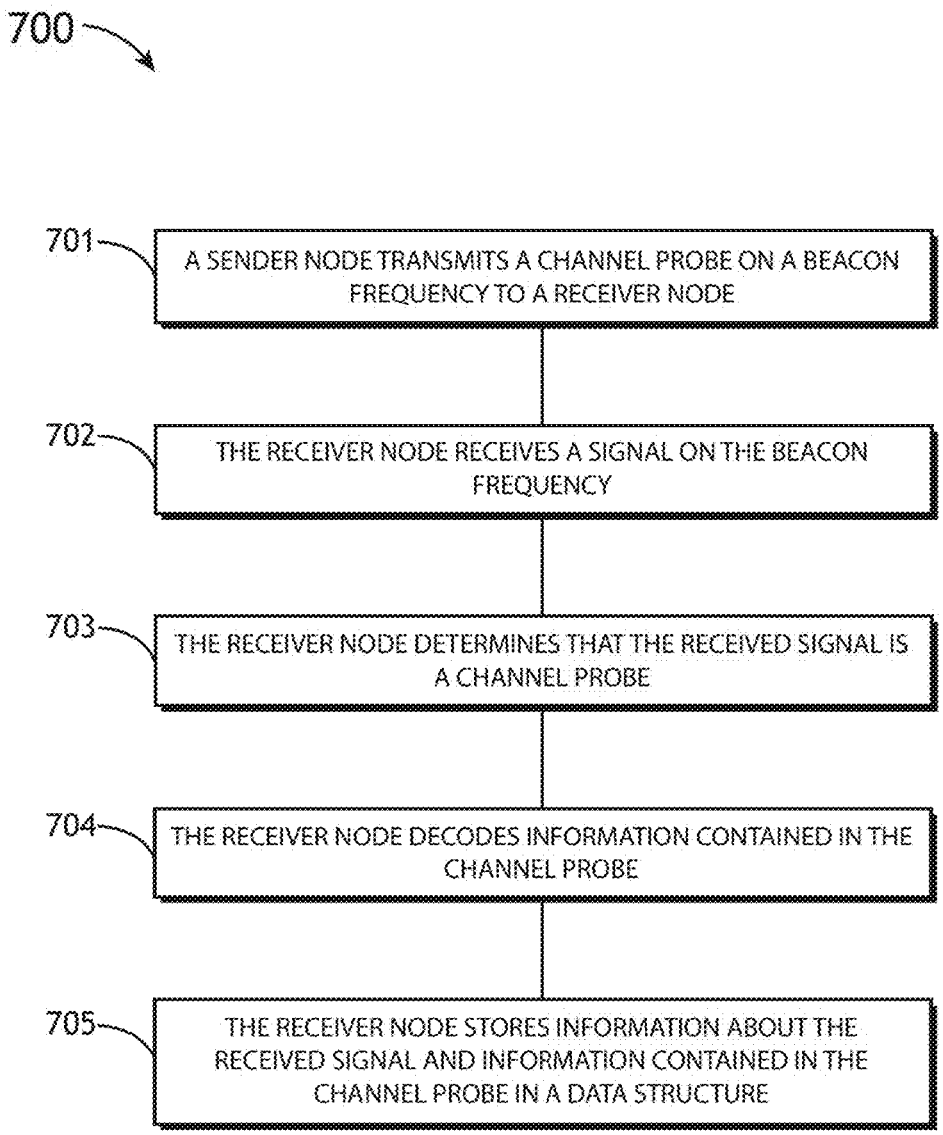
FIG. 7 depicts a flow diagram of a method of communicating channel quality information from a sender node to a receiver node of one embodiment.

Referring now to FIG. 7, a method of communicating channel quality information from a sender node to a receiver node of one embodiment is shown. A step 701 may include a sender node transmitting a channel probe on a beacon frequency to a receiver node. A step 702 may include the receiver node receiving a signal on the beacon frequency. A step 703 may include the receiver node determining that the received signal is a channel probe. A step 704 may include the receiver node decoding information contained in the channel probe. A step 705 may include the receiver node storing information about the received signal and information contained in the channel probe in a data structure maintained in a non-transitory computer readable medium. Further, the method may include any of the operations disclosed throughout.

Figure 8:
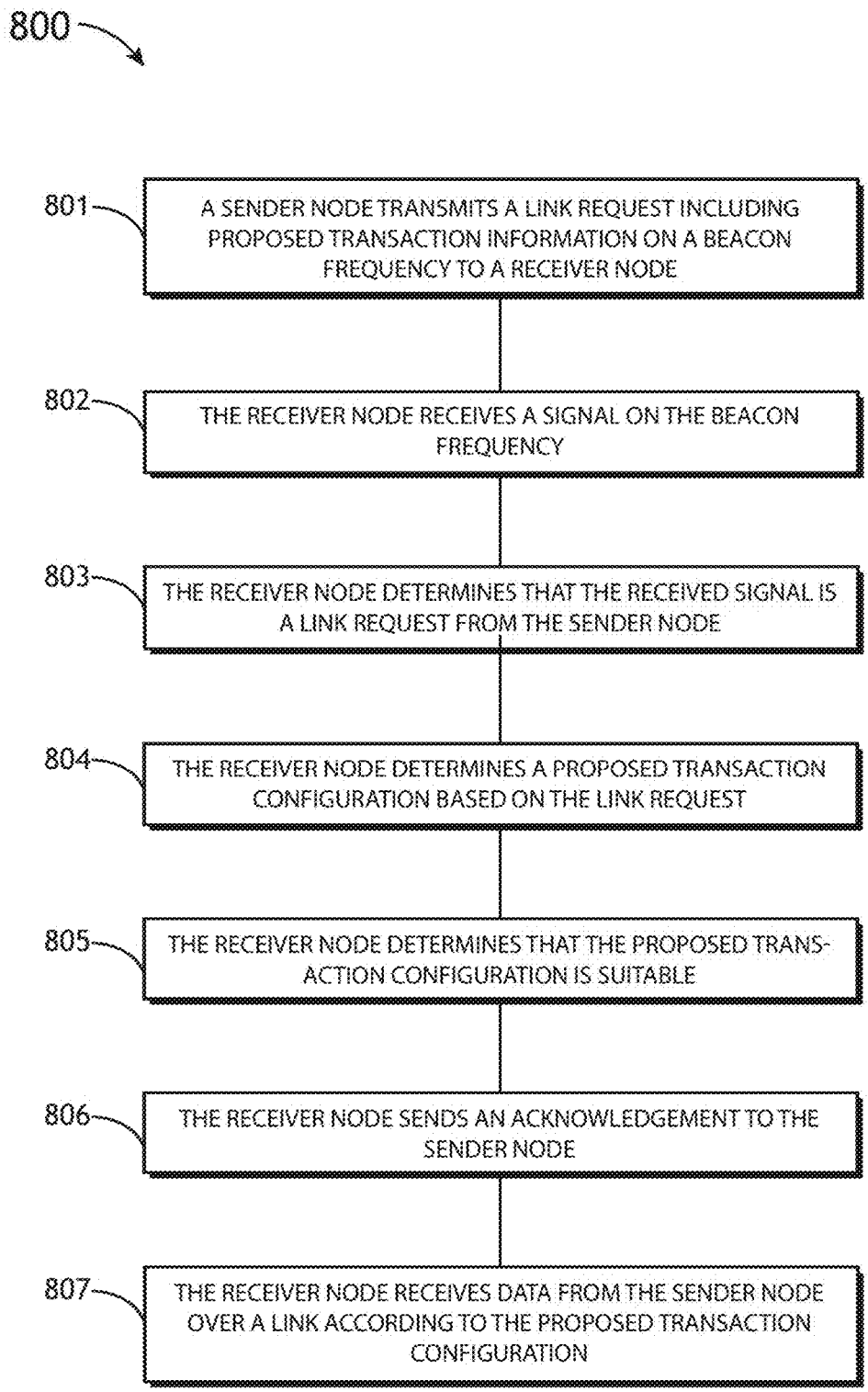
FIG. 8 depicts a flow diagram of a method of establishing a data link between a sender node and a receiver node of one embodiment.

Referring now to FIG. 8, a method of establishing a data link between a sender node and a receiver node of one embodiment is shown. In a step 801, a sender node transmits a link request including proposed transaction information on a beacon frequency to a receiver node. A processor of the sender node may determine a suitable or best propagating spectrum sector based upon SNR, delay spread, signal strength, type of service, time of day, approximate distance between the nodes, and the spectrum sector location that provides an unoccupied or least occupied bandwidth. The link request may be transmitted on a beacon frequency and may include proposed transaction information, such as sender node's address, the target's address, the proposed transaction frequency to be used (which may be different from the beacon frequency), the bandwidth to be used at the proposed transaction frequency, the service type, and the location of the sender. In a step 802, the receiver node receives a signal on the beacon frequency. In a step 803, the receiver node determines that the received signal is a link request from the sender node. In a step 804, the receiver node determines a proposed transaction configuration (which also may be referred to as a proposed link configuration) based on the link request. In a step 805, the receiver node may determine that the proposed transaction configuration is suitable such as by comparing the sender node's proposed transaction frequency and proposed bandwidth with information contained the receiver node's spectrum and/or channel propagation data structures. In a step 806, the receiver node may send an acknowledgement to the sender node that confirms that the proposed transaction information is acceptable. In a step 807, the receiver node receives data from the sender node over a link according to the proposed transaction configuration. Further, the method may include any of the operations disclosed throughout.

Figure 9:
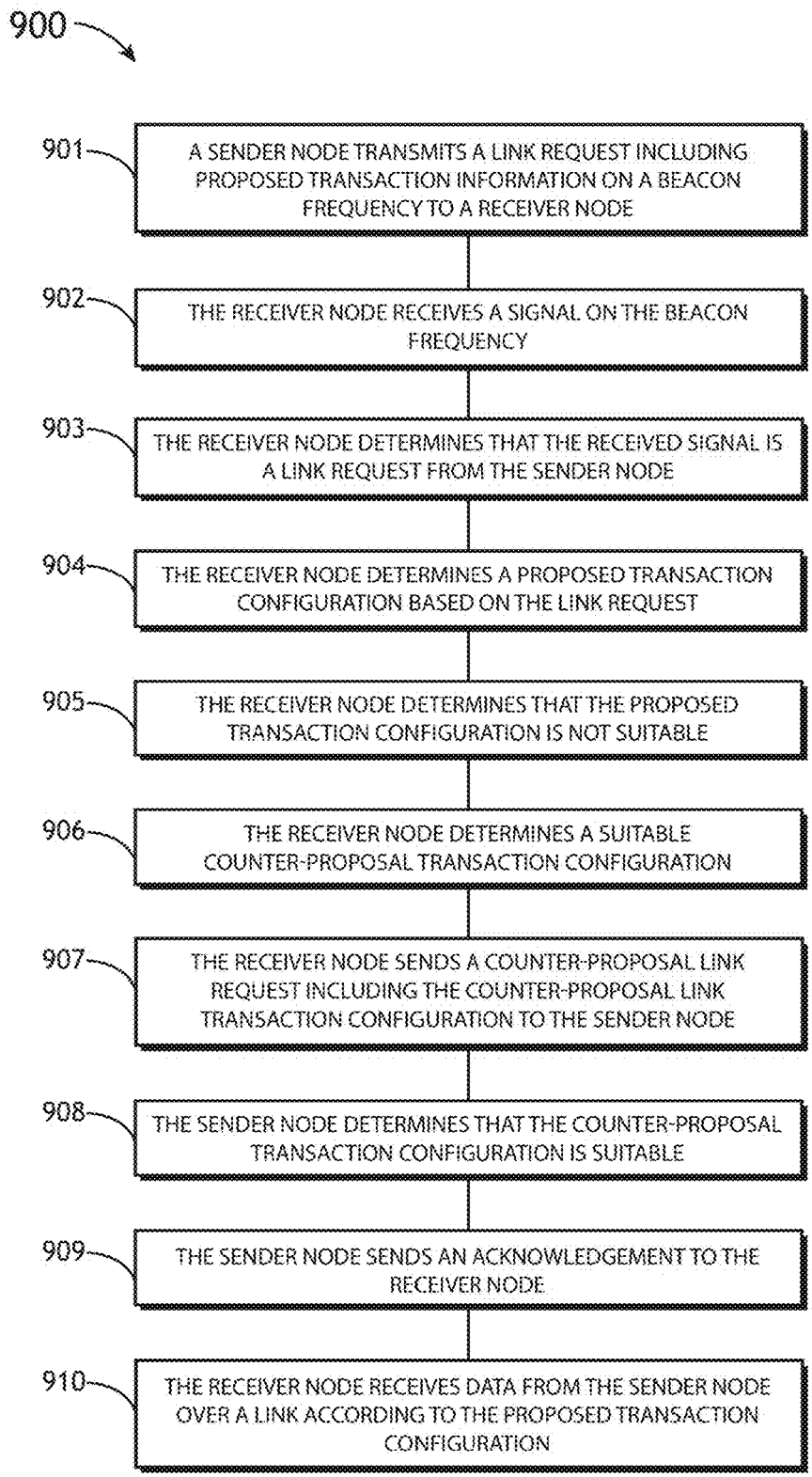
FIG. 9 depicts a flow diagram of a method of establishing a data link between a sender node and a receiver node of one embodiment.

Referring now to FIG. 9, a method of establishing a data link between a sender node and a receiver node of one embodiment is shown. In a step 901, a sender node transmits a link request including proposed transaction information on a beacon frequency to a receiver node. In a step 902, the receiver node receives a signal on the beacon frequency. In a step 903, the receiver node determines that the received signal is a link request from the sender node. In a step 904, the receiver node determines a proposed transaction configuration (which also may be referred to as a proposed link configuration) based on the link request. In a step 905, the receiver node determines that the proposed transaction configuration is not suitable. In a step 906, the receiver node determines a suitable counter-proposal transaction configuration (which also may be referred to as a counter-proposal link configuration). In a step 907, the receiver node sends a counter-proposal link request including the counter-proposal transaction configuration to the sender node. In a step 908, the sender node determines that the counter-proposal transaction configuration is suitable. In a step 909, the sender node sends an acknowledgement to the receiver node. In a step 910, the receiver node receives data from the sender node over a link according to the proposed transaction configuration. Further, the method may include any of the operations disclosed throughout.

Figure 10:
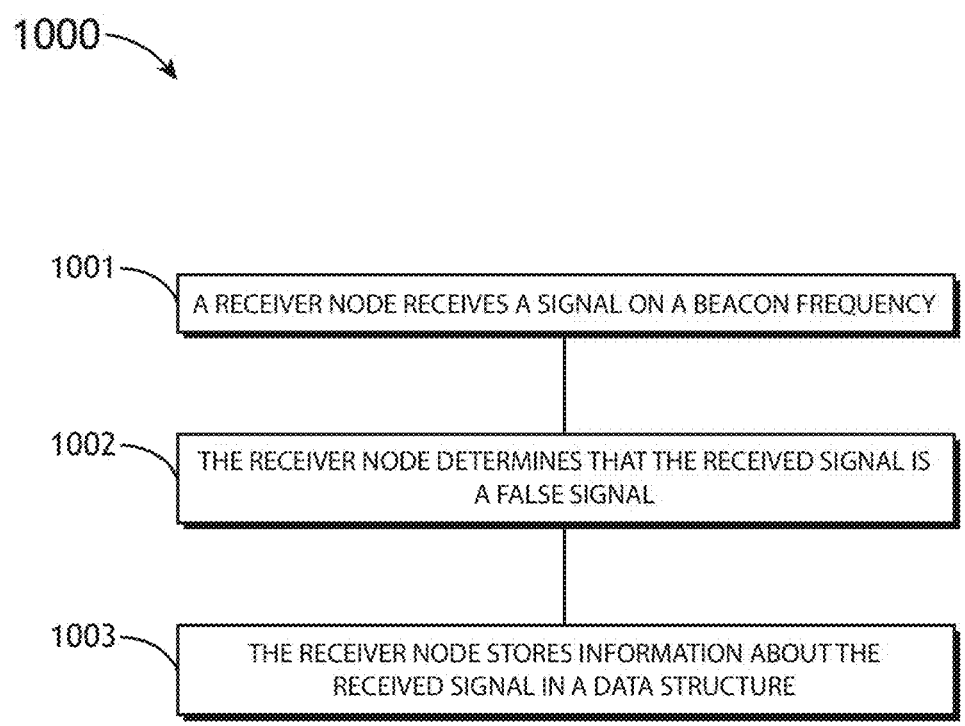
FIG. 10 depicts a flow diagram of a method of storing information about a false signal of one embodiment.

Referring now to FIG. 10, a method of storing information about a false signal of one embodiment is shown. In a step 1001, a receiver node receives a signal on a beacon frequency. In a step 1002, the receiver node determines that the received signal is a false signal. In a step 1003, the receiver node stores information about the received signal in a data structure maintained in a non-transitory computer readable medium. Further, the method may include any of the operations disclosed throughout.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is believed that embodiments of the inventive concepts disclosed herein and many of their attendant advantages will be understood by the foregoing description, and it will be apparent that various changes can be made in the form, construction, and arrangement of the components thereof without departing from the scope of the inventive concepts or without sacrificing all of their material advantages. The form herein before described being merely an explanatory embodiment thereof, it is the intention of the following claims to encompass and include such changes.

What is claimed is:
1. A method, comprising:
monitoring, by at least one receiver of a first node, at least a portion of a spectrum;
receiving, by the at least one receiver of the first node, a channel probe from at least one other node, the channel probe being within a beacon frequency range;
decoding channel quality metrics associated with the at least one other node from the channel probe;
receiving, by the at least one receiver of the first node, a signal on a first frequency within a range of frequencies, the first frequency being a beacon frequency within the beacon frequency range;
determining that the received signal is a link request from the at least one other node;
decoding a proposed link configuration from the link request, the proposed link configuration at least including a location of the at least one other node and at least one proposed transaction frequency for a transaction to be sent to the first node from the at least one other node, the at least one proposed transaction frequency being outside of the beacon frequency range, the at least one proposed transaction frequency being different from the first frequency;
determining, by at least one processor of the first node, that the proposed link configuration is not suitable;
selecting, by the at least one processor of the first node, a counter-proposal link configuration based at least on the channel quality metrics associated with the at least one other node;
sending, by a transmitter of the first node, a counter-proposal link request to the at least one other node, the counter-proposal link request including the counter-proposal link configuration at least including at least one counter-proposal transaction frequency for the transaction to be sent to the first node from the at least one other node, the at least one counter-proposal transaction frequency being outside of the beacon frequency range;

receiving, by the at least one receiver of the first node and from the at least one other node, an acknowledgement confirming that the counter-proposal link configuration is suitable; and receiving, by the at least one receiver of the first node, at least one signal indicative of the transaction on the at least one counter-proposal transaction frequency from the at least one other node;

receiving, by the at least one receiver of the first node, a second signal on a second frequency within the range of frequencies; and determining that the received second signal is a false signal based at least in part on the second signal lacking an expected preamble indicative of being another channel probe, wherein the channel probe, the counter-proposal link request, the acknowledgement, the signal, and the at least one signal are in the high frequency (HF) spectrum, wherein the channel probe, the counter-proposal link request, the acknowledgement, the signal, and the at least one signal are at least one of reflected or refracted off earth's ionosphere resulting in beyond-line-of-sight communications between the first node and the at least one other node.

2. The method of claim 1, further comprising:

determining a spectrum occupancy profile of the spectrum based on monitoring at least the portion of the spectrum, the spectrum occupancy profile at least including information of unused frequencies of at least the portion of the spectrum; and wherein selecting, by the at least one processor of the first node, the counter-proposal link configuration based at least on the channel quality metrics associated with the at least one other node further comprises:

selecting, by the at least one processor of the first node, the counter-proposal link configuration based at least on the channel quality metrics associated with the at least one other node and the spectrum occupancy profile.

3. The method of claim 1, further comprising:

determining a spectrum occupancy profile of the spectrum based on monitoring at least the portion of the spectrum, the spectrum occupancy profile at least including information of unused frequencies of at least the portion of the spectrum; and wherein selecting, by the at least one processor of the first node, the counter-proposal link configuration based at least on the channel quality metrics associated with the at least one other node further comprises:

selecting, by the at least one processor of the first node, the counter-proposal link configuration based at least on at least one of a signal-to-noise ratio, a delay spread, a signal strength, a type of service, a time of day, an approximate distance between the first node and the at least one other node, and a spectrum sector location having a least occupied bandwidth.

4. The method of claim 1, wherein the proposed link configuration further includes a transaction bandwidth, a type of service, the first node's address, and the at least one other node's address.

5. The method of claim 1, wherein the second frequency is within the beacon frequency range.

6. The method of claim 5, further comprising:

storing information related to the false signal in a non-transitory computer readable medium, the stored information including a bandwidth, a frequency, and a modulation of the false signal.

7. The method of claim 6, further comprising:

receiving, by the at least one receiver of the first node, a third signal on a third frequency within the range of frequencies; and determining that the received third signal is another false signal based at least in part on stored information related to the false signal.

8. A node of a network, comprising:

a transmitter of a first node;

at least one receiver of the first node configured to monitor at least a portion of a spectrum and to receive a signal on a first frequency within a range of frequencies, the first frequency being a beacon frequency within a beacon frequency range;

at least one processor of the first node configured to determine that the received signal is a link request from at least one other node; and a demodulator component of the first node configured to decode a proposed link configuration from the link request, the proposed link configuration at least including a location of the at least one other node and at least one proposed transaction frequency for a transaction to be sent to the node from the at least one other node, a transaction bandwidth, a type of service, and at least one of the first node's address, the at least one other node's address, and a location of the at least one other node, the at least one proposed transaction frequency being outside of the beacon frequency range, the at least one proposed transaction frequency being different from the first frequency, wherein the at least one processor is further configured to determine whether the proposed link configuration is suitable, wherein the at least one receiver is further configured to receive at least one signal indicative of the transaction from the at least one other node, wherein the at least one processor is further configured to determine that the proposed link configuration is not suitable, wherein the transmitter is configured to send a counter-proposal link request to the at least one other node, the counter-proposal link request including a counter-proposal link configuration at least including at least one counter-proposal transaction frequency for the transaction to be sent to the first node from the at least one other node, wherein the at least one receiver is further configured to receive an acknowledgement from the at least one other node confirming that the counter-proposal link configuration is suitable, and wherein the at least one receiver is further configured to receive the at least one signal indicative of the transaction on the at least one counter-proposal transaction frequency from the at least one other node, wherein the at least one receiver is further configured to receive a second signal on a second frequency within the range of frequencies, wherein the at least one processor is further configured to determine that the received second signal is a false signal based at least in part on the second signal lacking an expected preamble indicative of being another channel probe, wherein the channel probe, the counter-proposal link request, the acknowledgement, the signal, and the at least one signal are in the high frequency (HF) spectrum, wherein the channel probe, the counter-proposal link request, the acknowledgement, the signal, and the at least one signal are at least one of reflected or refracted off earth's ionosphere resulting in beyond-line-of-sight communications between the first node and the at least one other node.

9. The node of claim 8, further comprising wherein the at least one receiver is further configured to receive a second signal on a second frequency within the range of frequencies, and wherein the at least one processor is further configured to determine that the received second signal is a false signal.

10. A method, comprising:

monitoring, by at least one receiver of a first node, at least a portion of a spectrum;

sending, by a transmitter of the first node, a channel probe to at least one other node, the channel probe being within a beacon frequency range;

determining, by at least one processor of the first node, a spectrum occupancy profile of the spectrum based on monitoring at least the portion of the spectrum, the spectrum occupancy profile at least including information of unused frequencies of at least the portion of the spectrum;

selecting, by the at least one processor of the first node, a proposed link configuration based at least on the spectrum occupancy profile and at least one of a signal-to-noise ratio, a delay spread, a signal strength, a type of service, a time of day, an approximate distance between the first node and the at least one other node, the proposed link configuration at least including a location of the first node and at least one proposed transaction frequency for a transaction to be sent to the at least one other node from the first node;

sending, by the transmitter of the first node over a frequency of the beacon frequency range, a link request including the proposed link configuration to the at least one other node, wherein the at least one proposed transaction frequency is outside of the beacon frequency range;

sending, by the transmitter of the first node, at least one signal indicative of the transaction to the at least one other node;

receiving, by the at least one receiver of the first node, a second signal on a second frequency within the range of frequencies; and determining that the received second signal is a false signal based at least in part on the second signal lacking an expected preamble indicative of being another channel probe, wherein the at least one signal is in the high frequency (HF) spectrum, wherein the at least one signal is at least one of reflected or refracted off earth's ionosphere resulting in beyond-line-of-sight communication between the first node and the at least one other node.

11. The method of claim 10, further comprising:

receiving, by the at least one receiver of the first node, an acknowledgment from the at least one other node, the acknowledgement confirming that the proposed link configuration is suitable, wherein sending, by the transmitter of the first node, the transaction to the at least one other node further comprises:

sending, by the transmitter of the first node, the at least one signal indicative of the transaction to the at least one other node on the at least one proposed transaction frequency.

12. The method of claim 1, further comprising:

determining a spectrum occupancy profile of the spectrum based on monitoring at least the portion of the spectrum, the spectrum occupancy profile at least including information of unused frequencies of at least the portion of the spectrum; and wherein selecting, by the at least one processor of the first node, the counter-proposal link configuration based at least on the channel quality metrics associated with the at least one other node further comprises:

selecting, by the at least one processor of the first node, the counter-proposal link configuration based at least on at least one of a signal-to-noise ratio, a signal strength, a type of service, a time of day, an approximate distance between the first node and the at least one other node, and a spectrum sector location having a least occupied bandwidth.

13. The method of claim 1, further comprising:

determining a spectrum occupancy profile of the spectrum based on monitoring at least the portion of the spectrum, the spectrum occupancy profile at least including information of unused frequencies of at least the portion of the spectrum; and wherein selecting, by the at least one processor of the first node, the counter-proposal link configuration based at least on the channel quality metrics associated with the at least one other node further comprises:

selecting, by the at least one processor of the first node, the counter-proposal link configuration based at least on a signal-to-noise ratio, a signal strength, a type of service, a time of day, an approximate distance between the first node and the at least one other node, and a spectrum sector location.

14. The method of claim 5, further comprising:

determining a spectrum occupancy profile of the spectrum based on monitoring at least the portion of the spectrum, the spectrum occupancy profile at least including information of unused frequencies of at least the portion of the spectrum; and wherein selecting, by the at least one processor of the first node, the counter-proposal link configuration based at least on the channel quality metrics associated with the at least one other node further comprises:

selecting, by the at least one processor of the first node, the counter-proposal link configuration based at least on a signal-to-noise ratio, a signal strength, a type of service, a time of day, an approximate distance between the first node and the at least one other node, and a spectrum sector location.

15. The method of claim 1, further comprising:

determining a spectrum occupancy profile of the spectrum based on monitoring at least the portion of the spectrum, the spectrum occupancy profile at least including information of unused frequencies of at least the portion of the spectrum; and wherein selecting, by the at least one processor of the first node, the counter-proposal link configuration based at least on the channel quality metrics associated with the at least one other node further comprises:

selecting, by the at least one processor of the first node, the counter-proposal link configuration based at least on a delay spread.

16. The method of claim 1, wherein one or more of the first node and the at least one other node are vehicular nodes.

17. The node of claim 8, wherein one or more of the first node and the at least one other node are vehicular nodes.

18. The method of claim 10, wherein one or more of the first node and the at least one other node are vehicular nodes.

19. The method of claim 1, wherein the proposed link configuration further includes a transaction bandwidth, a type of service, the first node's address, and the at least one other node's address, wherein the second frequency is within the beacon frequency range, the method further comprising:
    storing information related to the false signal in a non-transitory computer readable medium, the stored information including a bandwidth, a frequency, and a modulation of the false signal;
    receiving, by the at least one receiver of the first node, a third signal on a third frequency within the range of frequencies; and
    determining that the received third signal is another false signal based at least in part on stored information related to the false signal.

\* \* \* \* \*